United States Patent
Uitenbroek

(10) Patent No.: US 6,953,029 B2
(45) Date of Patent: Oct. 11, 2005

(54) METHOD OF SUPPLYING LIQUID GAS TO AN INTERNAL COMBUSTION ENGINE, A FUEL SUPPLY SYSTEM AND A FUEL SUPPLY AGGREGATE

(75) Inventor: Paul Uitenbroek, Kohlscheid (DE)

(73) Assignee: GET Gas Engine Technology B.V. (NL)

( * ) Notice: Subject to any disclaimer, the term of this patent is extended or adjusted under 35 U.S.C. 154(b) by 24 days.

(21) Appl. No.: 10/794,966

(22) Filed: Mar. 5, 2004

(65) Prior Publication Data

US 2004/0173191 A1 Sep. 9, 2004

(30) Foreign Application Priority Data

Mar. 7, 2003 (DE) ......................................... 103 10 147

(51) Int. Cl.[7] ............................................... F02B 43/00
(52) U.S. Cl. ...................................................... 123/527
(58) Field of Search ............................. 123/525, 527, 123/575, 27 GE, 3, 1 A

(56) References Cited

U.S. PATENT DOCUMENTS 4,485,792 A * 12/1984 van der Weide ............ 123/527
4,489,700 A * 12/1984 van der Weide ............ 123/527
4,606,319 A * 8/1986 Silva ........................... 123/525
6,609,509 B2 * 8/2003 Asada et al. ................. 123/680

FOREIGN PATENT DOCUMENTS

DE           373 1986        4/1989
DE           19827438        1/1999
JP           2002155787 A  * 5/2002  ........... F02D/41/14

* cited by examiner

*Primary Examiner*—Henry C. Yuen
*Assistant Examiner*—Hyder Ali
(74) *Attorney, Agent, or Firm*—Robert W Becker & Associates; Robert W Becker

(57) ABSTRACT

A method and apparatus are provided for supplying liquid gas as fuel to an internal combustion engine. From the liquid gas stream that is supplied to at least one liquid gas injection valve of the internal combustion engine, a portion is branched off and expanded. The liquid gas stream supplied to the internal combustion engine is cooled with coldness that results during the expansion, thus ensuring that the liquid gas stream supplied to the liquid gas injection valve is at least substantially liquid. The expanded liquid gas is supplied in a vaporous state to the internal combustion engine.

12 Claims, 2 Drawing Sheets

METHOD OF SUPPLYING LIQUID GAS TO AN INTERNAL COMBUSTION ENGINE, A FUEL SUPPLY SYSTEM AND A FUEL SUPPLY AGGREGATE

BACKGROUND OF THE INVENTION

The present invention relates to a method of supplying liquid gas as fuel to an internal combustion engine. The invention furthermore relates to a fuel supply system for an internal combustion engine that is operated with liquid gas, and also to a fuel supply aggregate for such a fuel supply system.

Internal combustion engines that operate with liquid gas as fuel are finding increasing application, especially due to the improved environmental compatibility in contrast to conventional, liquid fossil fuels. In the following, the term liquid gas refers to liquefied gas, for example liquid natural gas or liquid petroleum gas, which are primarily gases based on hydrocarbons that are liquid at greater than atmospheric pressure and/or at less than the normal ambient temperature.

With the supply of such liquid gases to the mixture forming systems of internal combustion engines, which is generally effected via precisely controlled injection valves, there occurs the problem that vapor bubbles form in the liquid gas supply line that occur, for example, when, upon opening of the injection valve, the system pressure drops below the pressure at which the liquid gas is liquid at the prevailing temperature. The bubbles of vaporized liquid gas form, with the liquid phase of the liquid gas, a two-phase stream that can be accurately metered only with difficulty or barely at all, since during a prescribed injection duration the quantity of the liquid gas varies depending upon the vapor and liquid content. To resolve this problem, it is provided in the state of the art to significantly increase the system pressure beyond the two-phase equilibrium pressure, thereby preventing the formation of vapor bubbles and as a result of which the fuel remains entirely in the liquid phase. Connected with an increase in the system pressure is a significant technical expenditure for the pumps, since liquid gas has poor lubrication properties. In addition, the fuel system must have a return line, since with low fuel through-puts the pressure increase effected by the pumps is not adequate to compensate for the tendency to form vapor bubbles caused by heating.

An important characteristic of the liquid gas injection is that the quantity of fuel injected in a liquid state can during vaporization thereof rapidly absorb heat from the environment. This helps the engine for an improved fuel injection if it is running under high load since the lower intake temperatures, or the increased mixture density, achieved due to the cooling off, increase the drawn-in mixture quantity for each cycle. In addition, due to the cooling off, the proximity to the knock limit is increased. At partial load, the indicated characteristic has a drawback that due to the increased mixture density and/or the lower intake temperature a greater throttling must be effected, which leads to intake losses.

It is therefore an object of the present invention to provide a resolution for the aforementioned problems.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
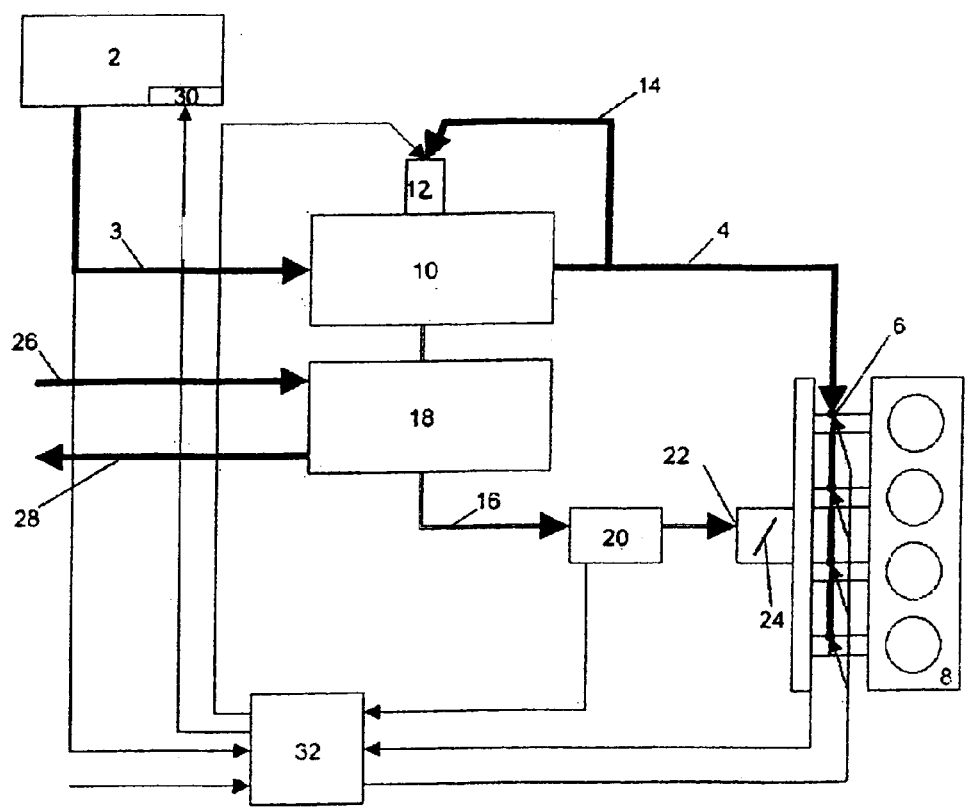
FIG. 1 shows a block diagram of one exemplary fuel supply system of the present application.

With the method of the present application, a portion of the liquid gas stream that is supplied to the at least one liquid gas injection valve of the internal combustion engine is branched off and expanded, the liquid gas stream that is supplied to the internal combustion engine is cooled by the coldness that results during the expansion, so that the liquid gas stream that is supplied to the liquid gas injection valve is at least substantially liquid, and the expanded liquid gas is supplied in a vaporous state to the internal combustion engine.

Consequently, with the inventive method the liquid gas stream that is to be metered is divided, in an electronically controlled manner, into a gaseous or vaporous partial stream and a liquid partial stream. In this connection, the enthalpy of vaporization required for the generation of the gaseous partial stream is withdrawn from the liquid partial stream. The temperature reduction connected therewith prevents vapor bubbles from forming in the liquid gas stream, and thus also prevents the aforementioned metering problems as a consequence of a two-phase flow. The electronically regulated division or splitting of the fuel stream furthermore enables, at partial load or throttle operation of the engine, a greater percentage (up to 100%) of gaseous supply to the engine, and at full throttle a greater percentage of liquid phase supply. This reduces the throttle losses at lower loads and increases the fuel injection at full throttle.

The branching off of the portion of the liquid gas stream can be effected first after cooling off of the liquid gas stream by the coldness that results during the expansion. In addition, heat can be supplied to the expanded liquid gas, whereby this heat can be withdrawn from the exhaust heat of the internal combustion engine. As the load of the internal combustion engine drops, a greater portion of fuel can be supplied to the engine as liquid gas vapor.

The basic construction of a fuel supply system of the present application includes a liquid gas tank for receiving liquid gas; a temperature control device for supplying heat to the liquid gas in the tank; a liquid gas line that leads from the liquid gas tank to a liquid gas injection valve of the internal combustion engine, and that passes through a cooling heat exchanger; a branch line that branches off from the liquid gas line and leads to an expansion device, which opens into a vapor line that extends through the cooling heat exchanger and subsequently a heating cool exchanger to a vapor feed device for supplying vapor to the internal combustion engine; and an electronic control unit that is connected to sensors for determining the operating state of the internal combustion engine and of the fuel, wherein the electronic control unit controls the heating device (the temperature control device), the liquid gas injection valve, and at least the expansion device or the vapor feed device, as a function of the operating parameters, in such a way that the liquid gas passing to the liquid gas injection valve is present at least substantially in liquid form.

A storage or working tank can be disposed upstream of the vapor feed device. The expansion device can contain a timing or fixed cycle valve that is connected with the control unit, and the vapor feed device can contain an admixture valve. Furthermore, the expansion device can contain a pressure regulation valve, and the vapor feed device can contain a metering valve that is connected with the control unit. Cooling water from the internal combustion engine can flow though the heating heat exchanger. The branch line can branch off from the liquid gas line downstream of the cooling heat exchanger.

The fuel supply aggregate for the fuel supply system includes a housing having a seat for the mounting of the expansion device, with the housing also being provided with the cooling heat exchanger, the heating heat exchanger as well as connections for the supply of liquid gas, the outlet for cold liquid gas, the outlet for gaseous liquid gas, the inlet for cooling water and the outlet for cooling water. By means of this fuel supply aggregate, it is possible to apply the fuel supply system of the present application in an economical manner to any engine that is operated with liquid gas.

Further specific features of the present application will be described in detail subsequently.

DESCRIPTION OF SPECIFIC EMBODIMENTS

Referring now to the drawings in detail, pursuant to FIG. 1 a liquid gas tank 2, which is essentially known and is secured to a vehicle, is connected via a liquid gas line 3, 4 with liquid gas injection valves 6, which are disposed in intake tubes that are associated with individual cylinders of an internal combustion engine 8. The liquid gas line 3,4 passes through a cooling heat exchanger 10. Associated with the cooling heat exchanger 10 is an expansion device 12 that is connected with the liquid gas line 4 via a branch line 14 that branches off from the liquid gas line 4 downstream of the cooling heat exchanger. A vapor line 16 leads from the cooling heat exchanger 10, through a heating heat exchanger 18, into a storage or working tank 20 and from there to a vapor supply or feed device 22, which upstream of a throttle or butterfly valve 24 leads into the intake system of the internal combustion engine 8.

Via a supply line 26 and a drain line 28, the heating heat exchange 18 is connected with the cooling system of the internal combustion engine 8.

The liquid gas, which is in the liquid gas tank 2 and forms the fuel for the internal combustion engine 8, can be tempered, in particular can be heated up, via a tempering or temperature control device 30 in order to ensure the required system pressure in the liquid gas line 4.

To control the temperature control device 30, the expansion device 12, the liquid gas injection valves 6 and/or the vapor feed device 22, an electronic control unit 32 is provided that in a known manner contains a microprocessor having a pertaining programming and data storage device. Supplied to the control unit 32 as input values from appropriate, non-illustrated sensors are the pressure and the temperature of the vapor in the working tank 20, the pressure and the temperature in the intake tube of the internal combustion engine 8 downstream of the butterfly valve 24, the pressure and the temperature of the liquid gas in the liquid gas line, 4, preferably measured as close as possible upstream of the intake tube of the internal combustion engine 8. It is to be understood that further values, such as the speed of the internal combustion engine, the cooling water temperature, etc. can be supplied to the control unit 32. With the aid of the input values, values are calculated in the control unit 32 that determine the power, that is supplied to the temperature control device 30, and that determine the function of the expansion device 12 and/or of the vapor feed device 22, and also determine the injection durations and advantageously their phases relative to the position of the pistons of the liquid gas injection valves 6.

The system described above functions as follows:

By tempering the liquid gas in the tank 2 via the temperature control device 30, there is ensured that a predetermined system pressure is always available in the liquid gas line 4. The liquid gas flow that is branched off from the liquid gas flow in the line 4 via the branch line 14 is, after flowing through the expansion device 12, vaporized, whereby the necessary heat or enthalpy of vaporization is withdrawn from the liquid gas stream that is flowing through the liquid gas line 4. This ensures that only, or at least essentially only, liquid fuel passes through the liquid gas injection valves 6. Due to the fact that the branch line 14 branches off downstream of the cooling heat exchanger 10, there is ensured that essentially only liquid gas is supplied to the expansion device 12, and that well defined operating conditions are achieved for the expansion device. The expanded liquid vapor, that leaves the cooling heat exchanger 10 through the vapor line 16, is further heated up in the heating heat exchanger 18, thus ensuring that only vaporous fuel is found in a storage or working tank 20, even when the pressure again increases. This vaporous fuel is fed to the internal combustion engine through the vapor feed device 22. The total quantity of the fuel supplied to the internal combustion engine 8, and which is a function of the speed of the internal combustion engine and the position of the butterfly valve 24, is supplied, depending upon the load condition of the internal combustion engine by appropriate control of the liquid gas injection valve 6 and of the expansion device 12 and possibly of the vapor feed device 22, in liquid or vaporous form, whereby as the load increases the proportion of fuel supplied as liquid increases.

The control of the vaporized liquid gas supplied to the internal combustion engine 8 is preferably effected in two embodiments.

Pursuant to the first embodiment, the expansion device 12 is formed by a fixed-cycle or timing valve that is controlled by the control unit 32 in such a way that a gas pressure is established in the working tank 20 that is a function of the operating conditions of the internal combustion engine. In this case, the vapor feed device 22 is an admixing valve having a constant opening, so that the quantity of the gas passing into the internal combustion engine results to a large extent from the pressure in the working tank 20.

Pursuant to the second embodiment, the expansion device 12 is formed by a pressure-regulating valve, for example a simple diaphragm valve, so that a constant vapor or gas pressure is established in the working tank 20. The metering of the gas supply to the internal combustion engine is effected via the vapor feed device 22, which is embodied as an electrically controllable valve, the effective valve opening area of which is controlled by the control unit 32.

It is to be understood that combined controls could also be utilized, where not only the pressure in the working tank 20 can be varied via the expansion device (fixed-cycle or a proportionally controllable valve) that is controlled by the control unit 32, but also the effective flow-through area of the vapor feed device 22 can be varied by the control unit 32. For example, the expansion device 12 can be embodied as an electrically controllable pressure-regulating unit. The vapor feed device 22 can also be embodied as a metering valve having a variable cross-section or a constant cross-section that is opened and closed in a cycled manner.

The described system can be varied in any number of ways.

The pressure in the liquid gas line 3 need not necessarily be regulated via the temperature control device 30 to a predetermined pressure. It is merely necessary to ensure that the pressure in the line 3 is as high as required for the satisfactory functioning of the components disposed downstream thereof, for example as it is necessary for the minimum supply pressure of a timing valve when the expansion device 12 is embodied as a timing valve, or for the case where the expansion device is not electrically controlled and it is necessary for an adequate pressure in the working tank 20. It is to be understood that the liquid gas injection valves 6 also require a predetermined minimum pressure.

In the cold state of the internal combustion engine 8, the heating heat exchanger 18 can additionally be electrically heated. Furthermore, in addition to the energy of the cooling water, the energy of the exhaust gas can be used in the heating heat exchanger 18 for heating up the liquid gas vapor.

The working tank 20 is not absolutely necessary. However, it has the advantage that an adequate volume of liquid gas vapor is respectively available, and the pressure of the vapor does not abruptly change with every brief change of the flow through cross-section of the expansion device 12 or of the vapor injection or feed device 22.

The branch line 14 can branch off from the liquid gas line 4 upstream of the cooling heat exchanger 10. The liquid gas injection valves 6 need not necessarily be individually associated with each cylinder of the internal combustion engine 8. Conversely, vapor feed devices 22 can be provided that are associated with each cylinder. The vapor feed device can, with appropriate control thereof, be provided downstream of the throttle valve 24.

It is to be understood that the described system is also suitable for internal combustion engines where the control of the load is effected without a butterfly valve 24 or some similar throttle valve.

Figure 2:
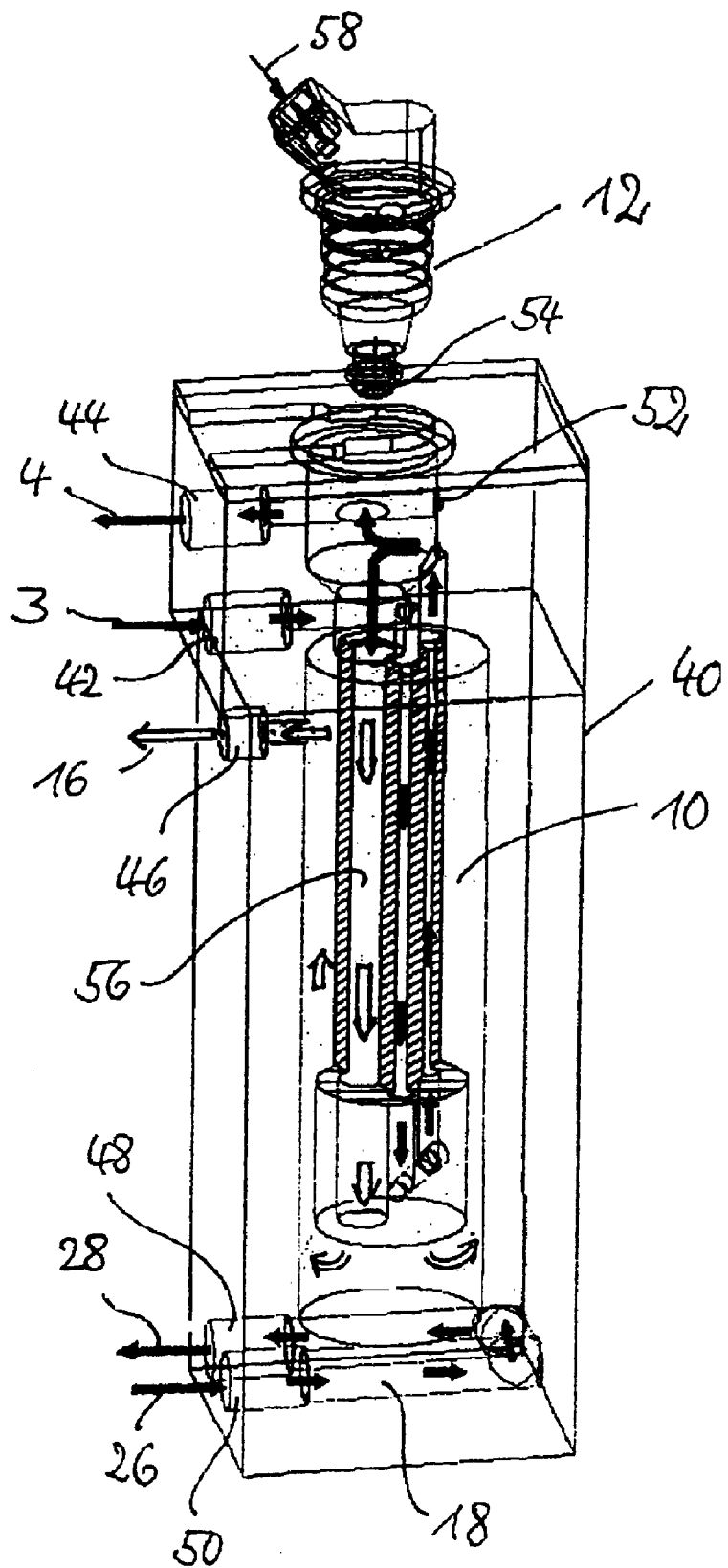
FIG. 2 shows a fuel supply aggregate.

The described components are advantageously combined within a housing to form a compact aggregate, as illustrated by way of example in FIG. 2. A housing 40 is provided with connections 42, 44, 46, 48 and 50 for the connection of the liquid gas line 3, the liquid gas line 4, the vapor line 16, the supply line 26 for cooling water, and the drain line 28 for cooling water. Disposed within the housing 40 are the cooling heat exchanger 10 and the heating heat exchanger 18. Above the cooling heat exchanger 10, the housing 40 is provided with a seat 52 for the mounting of the expansion device 12, for example an expansion valve, the outlet nozzle 54 of which, in its installed state, extends into a channel 56 of the cooling heat exchanger 10. The vaporized or gaseous liquid gas flows through the cooling heat exchanger 10, and subsequently the heating heat exchanger 18, and leaves the aggregate via the connection 46. The liquid gas supplied to the connection 42 flows through the cooling heat exchanger 10 in counter current, and leaves the aggregate via the connection 44. The expansion valve 12 mounted in the seat 52 is supplied with cooled liquid gas, after the latter has flowed through the cooling heat exchanger 10, through an opening that is formed in the seat and that is aligned with a corresponding lateral opening of the expansion valve 12. The reference numeral 58 designates an electrical terminal of the expansion valve 12, which can be connected with the control unit 32.

The housing 40 is advantageously comprised of two parts, with the upper part, which has the connections 42 and 44, being made of a poorly heat conductive material, for example polymeric material, while the lower portion, which contains the heat exchanger, being made of a material that has good heat conducting properties, such as aluminum.

The aggregate illustrated in FIG. 2, which forms a fuel supply module, advantageously contains non-illustrated sensors as well as, possibly, actuators for the detection of the respective operating parameters and for the adjustment of controllable values, for example the opening sizes of the expansion valve 12.

It is to be understood that the working tank 20 and the vapor feed device 22 can also be integrated into the aggregate or housing 40.

The specification incorporates by reference the disclosure of German priority document 103 10 147.0 filed Mar. 7, 2003.

The present invention is, of course, in no way restricted to the specific disclosure of the specification and drawings, but also encompasses any modifications within the scope of the appended claims.

Reference Numeral List

2 Liquid Gas Tank
3 Liquid Gas Line
4 Liquid Gas Line
6 Liquid Gas Injection Valve
8 Internal Combustion Engine
10 Cooling Heat Exchanger
12 Expansion Device
14 Branch Line
16 Vapor Line
18 Heating Heat Exchanger
20 Storage or Working Tank
22 Vapor Supply or Feed Device
24 Throttle or Butterfly Valve
26 Supply Line
28 Drain Line
30 Tempering or Temperature Control Device
32 Control Unit
40 Housing
42 Connection
44 Connection
46 Connection
48 Connection
50 Connection
52 Seat
54 Outlet Nozzle
56 Channel
58 Terminal

I claim:

1. A method of supplying liquid gas as fuel to an internal combustion engine, including the steps of:
   providing a liquid gas stream for supply to at least one liquid gas injection valve of said internal combustion engine;
   branching off and expanding a portion of said liquid gas stream;
   cooling said liquid gas stream that is supplied to said internal combustion engine with coldness that results during expansion of said branched-off portion of said liquid gas stream so that said liquid gas stream supplied to said at least one liquid gas injection valve 6 is at least substantially liquid; and
   supplying expanded liquid gas in a vaporous state to said internal combustion engine.

2. A method according to claim 1, which includes the step of effecting said branching off of said portion of said liquid gas stream only after cooling of said liquid gas stream with coldness resulting during expansion.

3. A method according to claim 1, which includes the step of supplying heat to expanded liquid gas.

4. A method according to claim 3, wherein said heat is withdrawn from exhaust heat of said internal combustion engine.

5. A method according to claim 1, which includes the step, as a load of said internal combustion engine drops, of supplying a greater portion of fuel as vaporous liquid gas.

6. A fuel supply system for an internal combustion engine that is operated with liquid gas, comprising:
- a liquid gas tank for receiving liquid gas;
- a temperature control device for supplying heat to liquid gas in said liquid gas tank;
- a cooling heat exchanger;
- a liquid gas line leading from said liquid gas tank to at least one liquid gas injection valve of said internal combustion engine, wherein said liquid gas line passes through said cooling heat exchanger;
- a branch line that branches off from said liquid gas line;
- a heating heat exchanger;
- a vapor feed device;
- a vapor line that extends through said cooling heat exchanger and subsequently said heating heat exchanger 18 and then to said vapor feed device for supplying vapor to said internal combustion engine;
- an expansion device that opens into said vapor line, wherein said branch line leads to said expansion device; and
- an electronic control unit that is connected to sensors for a determination of an operating state of said internal combustion engine and of fuel, wherein said control unit controls said temperature control device, said at least one liquid gas injection valve, and at least said cooling heat exchanger or said vapor feed device, as a function of operating parameters, in such a way that liquid gas passing to said at least one liquid gas injection valve is present at least substantially in liquid form.

7. A fuel supply system according to claim 6, wherein a working tank is disposed upstream of said vapor feed device.

8. A fuel supply system according to claim 6, wherein said expansion device contains a timing valve that is connected to said control unit, and wherein said vapor feed device contains an admixture valve.

9. A fuel supply system according to claim 6, wherein said expansion device contains a pressure regulating valve, and wherein said vapor feed device contains a metering valve that is connected to said control unit.

10. A fuel supply system according to claim 6, wherein cooling water of said internal combustion engine flows through said heating heat exchanger.

11. A fuel supply system according to claim 6, wherein said branch line branches off from said liquid gas line downsteam of said cooling heat exchanger.

12. A fuel supply unit for a fuel supply system according to claim 11, including a housing that is provided with a seat for a mounting of said expansion device, and wherein said housing furthermore accommodates said cooling heat exchanger, said heating heat exchanger, connections for a supply of liquid gas, an outlet for cooled liquid gas, an outlet for vaporous liquid gas, an inlet for said cooling water, and an outlet for said cooling water.

* * * * *